(12) United States Patent
Okuyama et al.

(10) Patent No.: US 10,766,183 B2
(45) Date of Patent: Sep. 8, 2020

(54) LIQUID BLOW-MOLDING METHOD FOR DELAMINATION CONTAINER

(71) Applicants: Yuichi Okuyama, Tokyo (JP); Kenichi Suyama, Tokyo (JP)

(72) Inventors: Yuichi Okuyama, Tokyo (JP); Kenichi Suyama, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 504 days.

(21) Appl. No.: 15/528,906

(22) PCT Filed: Oct. 13, 2015

(86) PCT No.: PCT/JP2015/005180
§ 371 (c)(1),
(2) Date: May 23, 2017

(87) PCT Pub. No.: WO2016/084302
PCT Pub. Date: Jun. 2, 2016

(65) Prior Publication Data
US 2017/0312978 A1    Nov. 2, 2017

(30) Foreign Application Priority Data
Nov. 27, 2014    (JP) ................................. 2014-240348

(51) Int. Cl.
*B29C 49/46*    (2006.01)
*B29C 49/22*    (2006.01)
(Continued)

(52) U.S. Cl.
CPC .............. *B29C 49/46* (2013.01); *B29C 49/06* (2013.01); *B29C 49/08* (2013.01); *B29C 49/12* (2013.01);
(Continued)

(58) Field of Classification Search
CPC ............ B29C 49/46; B29C 2049/4602; B29C 2049/4652; B29C 2049/4655; B29C 2049/4658; B29C 2043/3238
See application file for complete search history.

(56) References Cited

U.S. PATENT DOCUMENTS 5,301,838 A    4/1994 Schmidt et al.
5,344,045 A *  9/1994 Richter ................ B65D 1/0215
                                                        215/12.2
(Continued)

FOREIGN PATENT DOCUMENTS

EP         2902169     *  1/2013
JP         H08-175568 A   7/1996
(Continued)

OTHER PUBLICATIONS

Jul. 20, 2018 Extended Search Report issued in European Patent Application No. 15864249.6.
(Continued)

*Primary Examiner* — Stella K Yi
(74) *Attorney, Agent, or Firm* — Oliff PLC (57) ABSTRACT

A liquid blow-molding method for molding a delamination container from a resin container material. The resin container material includes an outer layer, an inner layer, and an ambient air introduction hole. The delamination container includes an outer layer body and an inner layer body, which is laminated on the inner side of the outer layer body in a manner such that the inner layer body is separatable from the outer layer body. The liquid blow-molding method includes the container molding step of molding the container material into the delamination container by supplying a pressurized liquid into the container material; and the inner layer body
(Continued)

separation step of separating the inner layer body from the outer layer body by sucking the liquid out of the delamination container.

15 Claims, 5 Drawing Sheets

(51) Int. Cl.
  *B29C 49/12* (2006.01)
  *B29C 49/06* (2006.01)
  *B29L 31/00* (2006.01)
  *B29C 49/08* (2006.01)

(52) U.S. Cl.
  CPC ........ *B29C 49/22* (2013.01); *B29C 2049/227* (2013.01); *B29C 2049/4664* (2013.01); *B29L 2031/712* (2013.01); *B29L 2031/7158* (2013.01)

(56) References Cited

U.S. PATENT DOCUMENTS

| | | | |
|---|---|---|---|
| 6,691,494 | B2 | 2/2004 | Nomoto et al. |
| 2003/0226856 | A1 | 12/2003 | Nakamura et al. |
| 2015/0210420 | A1 | 7/2015 | Hosokoshiyama |

FOREIGN PATENT DOCUMENTS

| | | |
|---|---|---|
| JP | 2009-148951 A | 7/2009 |
| JP | 2010-082916 A | 4/2010 |
| JP | 2012-116516 A | 6/2012 |
| JP | 2014-069441 A | 4/2014 |
| JP | 2014-088004 A | 5/2014 |

OTHER PUBLICATIONS

Nov. 17, 2015 International Search Report issued in International Patent Application No. PCT/JP2015/005180.

Sep. 13, 2018 Office Action issued in Chinese Patent Application No. 201580063503.6.

\* cited by examiner

LIQUID BLOW-MOLDING METHOD FOR DELAMINATION CONTAINER

TECHNICAL FIELD

The present disclosure relates to a liquid blow-molding method for molding a delamination container from a resin container material. The resin container material herein includes an outer layer, an inner layer, and an ambient air introduction hole provided in the outer layer to communicate between the outer layer and the inner layer. The delamination container includes an outer layer body and an inner layer body laminated on the inner side of the outer layer body in a manner such that the inner layer body is separatable from the outer layer body.

BACKGROUND

Separatable laminated containers, which are also called delamination containers, are used as containers containing cosmetics such as face lotion, shampoo, rinse, liquid soap, beverages, food seasonings, or the like (refer to, for example, Patent Literature 1).

Such a delamination container includes a tubular mouth. The delamination container also has a double structure including the outer layer body and the inner layer body laminated on the inner side of the outer layer body in a manner such that the inner layer body is separatable from the outer layer body. When the outer layer body is squeezed (compressed), a content liquid contained in the inner layer body is dispensed to the outside through the mouth. Once the squeezing of the outer layer body is released, ambient air is introduced between the outer layer body and the inner layer body through the ambient air introduction hole provided in the outer layer body, and the outer layer body is restored to its original shape while the volume of the inner layer body remains reduced. Thus, the delamination container may dispense the content liquid without replacing the content liquid with ambient air. Accordingly, contact between the content liquid remaining in the container and air is limited, and this prevents deterioration and change in quality of the content liquid.

Such a delamination container may be obtained by subjecting a preform (as a container material) to biaxially stretch blow-molding. The preform has been formed in a bottomed tubular shape including the outer layer and the inner layer by, for example, injection molding, direct blow (extrusion blow) molding, or extrusion molding.

A production process of the delamination container generally includes the initial separation processing of separating the inner layer body from the outer layer body in advance. The initial separation processing of the inner layer body is performed after blow-molding of the preform into the delamination container in which pressurized air is supplied into the preform. The initial separation processing is achieved by generating negative pressure inside the inner layer body by sucking out air inside the delamination container. After the initial separation processing, air is blown into the delamination container again to return the inner layer body to the state where it is laminated on the outer layer body. Subsequently, the container is filled with the content liquid. This ensures that the inner layer body may be separated from the outer layer body when the content liquid is dispensed.

CITATION LIST

Patent Literature

PTL1: JP2012116516A

SUMMARY

Technical Problem

Although a generally known blow-molding method for the delamination container includes supplying pressurized air into the preform, there is another known blow-molding method in which a pressurized liquid, instead of pressurized air, is supplied into the preform. According to the latter method, the content liquid, such as a beverage, a cosmetic product, a pharmaceutical product, or the like, that is to be filled into the delamination container as a final product may be used as the liquid. Accordingly, the step of filling the content liquid to the delamination container may be omitted, and the production process and the configuration of a blow-molding device may be simplified.

However, in liquid blow-molding in which the pressurized liquid is used, the inside of the delamination container is filled with the content liquid after the blow-molding. This makes it difficult to perform the initial separation processing on the inner layer body. The result is that the inner layer body hardly separates from the outer layer body when the content liquid is dispensed.

The present disclosure has been conceived in view of the above problem, and the present disclosure is to provide a liquid blow-molding method for molding the delamination container that ensures that the inner layer body may be separated from the outer layer body when the content liquid is dispensed.

Solution to Problem

One of aspects of the present disclosure resides in a liquid blow-molding method for molding a delamination container from a resin container material. The resin container material includes an outer layer, an inner layer, and an ambient air introduction hole provided in the outer layer to communicate between the outer layer and the inner layer. The delamination container includes an outer layer body and an inner layer body laminated on an inner side of the outer layer body in a manner such that the inner layer body is separatable from the outer layer body. The liquid blow-molding method includes: the container molding step of molding the container material into the delamination container by supplying a pressurized liquid into the container material; and the inner layer body separation step of separating the inner layer body from the outer layer body by sucking the liquid, which has been filled in the delamination container, out of the delamination container.

In a preferred embodiment of the liquid blow-molding method for molding a delamination, the liquid blow-molding method further includes: the inner layer body return step, performed after the inner layer body separation step, of laminating the inner layer body on an inner surface of the outer layer body by supplying the liquid again into the delamination container, in which the inner layer body has been separated from the outer layer body.

In another preferred embodiment of the liquid blow-molding method for molding a delamination container, the liquid supplied into the delamination container in the inner layer body return step is less in amount than the liquid supplied into the container material in the container molding step.

In yet another preferred embodiment of the liquid blow-molding method for molding a delamination container, in the container molding step, the pressurized liquid is supplied into the container material by actuating a plunger pump in a positive direction, in the inner layer body separation step, the liquid, which has been filled in the delamination container, is sucked out of the delamination container by actuating the plunger pump in a reverse direction, and in the inner layer body return step, the liquid is supplied into the delamination container by actuating the plunger pump in the positive direction again.

In yet another preferred embodiment of the liquid blow-molding method for molding a delamination container, the container material includes a preform having a bottomed tubular shape.

In yet another preferred embodiment of the liquid blow-molding method for molding a delamination container, the liquid blow-molding method further includes: the stretching step, performed prior to the container molding step, of stretching the preform in an axis direction by a stretching rod, wherein the inner layer body separation step is performed after the stretching rod is withdrawn from the delamination container.

Advantageous Effect

According to the present disclosure, the initial separation processing of separating the inner layer body from the outer layer body is performed on the delamination container formed by liquid blow-molding the container material. This permits molding of the delamination container that ensures that the inner layer body may be separated from the outer layer body when the content liquid is dispensed.

DETAILED DESCRIPTION

The present disclosure will be described in more detail below by illustration with reference to the drawings.

A liquid blow-molding method for molding a delamination container according to the present disclosure includes liquid blow-molding a resin container material into a delamination container by supplying a pressurized liquid into the container material. The delamination container herein includes an outer layer body and an inner layer body laminated on the inner side of the outer layer body in a manner such that the inner layer body is separatable from the outer layer.

The resin material includes an outer layer, an inner layer, and an ambient air introduction hole provided in the outer layer to communicate between the outer layer and the inner layer. The container material does not necessarily need to have the double structure including the outer layer and the inner layer. For example, the container material may have an intermediate layer (as a separable layer) that is disposed between the outer layer and the inner layer and that is made of a material different therefrom.

Figure 1:
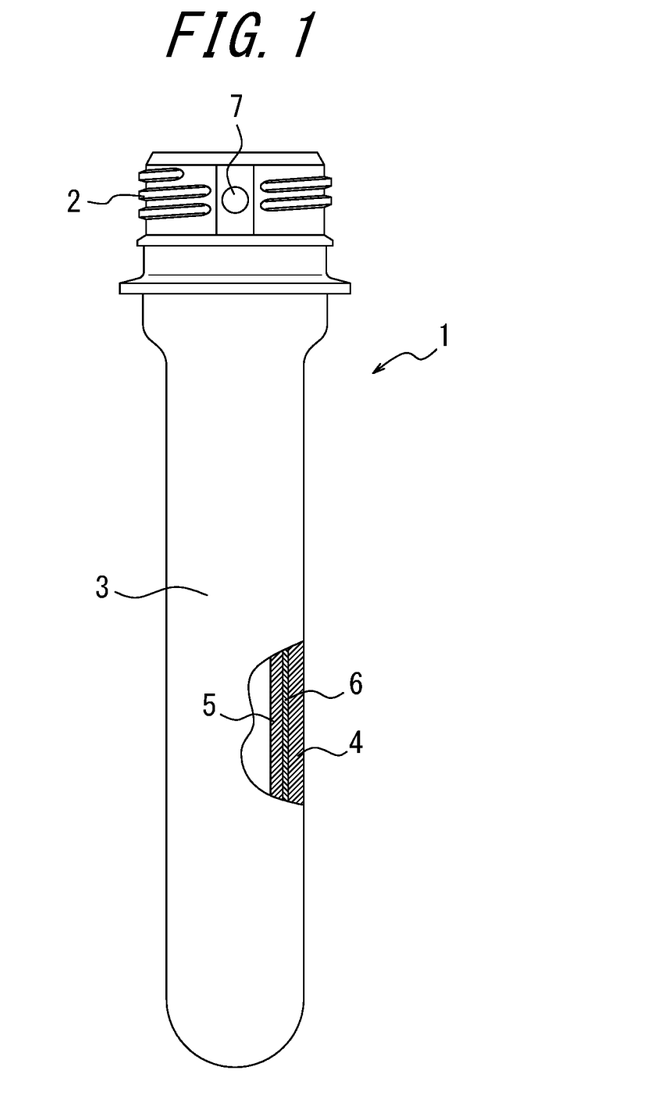
FIG. 1 is a partially cut-away front view illustrating an example of a preform used in a liquid blow-molding method for molding a delamination container according to one of embodiments of the present disclosure.
Figure 2:
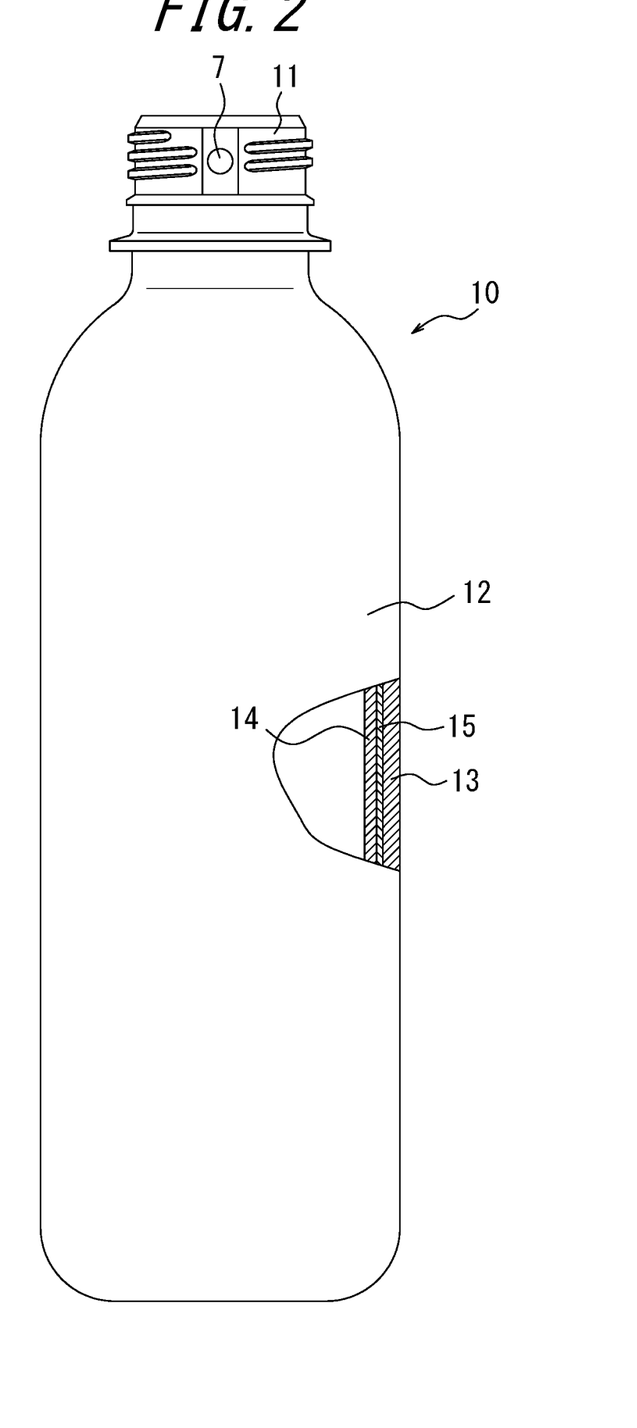
FIG. 2 is a partially cut-away front view illustrating an example of a delamination container formed by a liquid blow-molding method for molding a delamination container according to one of embodiments of the present disclosure.

FIG. 1 illustrates a preform 1 as an example of the container material, and FIG. 2 illustrates an example of a delamination container 10, which has been molded by a liquid blow-molding method for molding a delamination container according to the present disclosure.

The preform 1 illustrated in FIG. 1 may be adopted as the container material. In this case, the preform 1 has been formed by, for example, injection molding, direct blow-molding, extrusion molding, or compression molding. The preform 1 is formed in a bottomed tubular shape (test-tube shape) including a cylindrical mouth 2 and a main body 3, which is contiguous with the mouth 2. The preform 1 also includes an outer layer 4, an inner layer 5, and an intermediate layer (separable layer) 6, which is disposed between the outer layer 4 and the inner layer 5. The ambient air introduction hole 7 is provided in a portion of the outer layer 4 that forms the mouth 2 of the preform 1. Examples of a material of the preform 1 may include a variety of resin materials, such as polypropylene (PP), polyethylene terephthalate (PET), and polyethylene (PE), that has stretchability when being heated.

On the other hand, the delamination container 10, which has been molded by the liquid blow-molding method for molding a delamination container according to the present disclosure, includes a mouth 11, which maintains the same shape as in the preform 1, and a trunk 12, which is a stretched form of the main body 3. The delamination container 10 includes an outer layer body 13, an inner layer body 14, and an intermediate body 15, which respectively correspond to the outer layer 4, the inner layer 5, and the intermediate layer 6 of the preform 1.

Next, a description is given of a procedure of the liquid blow-molding method for molding a delamination container according to the present disclosure.

In the liquid blow-molding method for molding a delamination container according to the present disclosure, the container molding step is performed firstly. The container molding step involves liquid blow-molding, in which a liquid pressurized to a predetermined pressure is supplied into the container material (into the inner layer) in the state where the container material is heated to a temperature at which stretchability may be achieved and where the container material is fitted to a mold used for blow-molding. With the container molding step, the container material is molded into a delamination container having a shape conforming to a shape of a cavity of the mold with use of the pressure of the liquid.

As the liquid used in liquid blow-molding, a content liquid that is to be filled into the delamination container as a final product is preferably employed. Examples of the content liquid may include a beverage, a cosmetic product, a pharmaceutical product, and toiletry goods such as shampoo and rinse. However, any liquid, such as water, that is not to be filled into the delamination container as the final product may also be used.

Prior to the container molding step, the stretching step of stretching the preform in the axis direction by a stretching rod may be performed. This means that the container material may also be molded into the delamination container by biaxial stretch blow-molding. By thus performing the stretching step, it is ensured that the container material may be molded into the delamination container having a desired shape with a greater stretch (draw) ratio.

In cases where the stretching step is performed, the container molding step is performed preferably in the state where the container material is stretched in the axial direction as much as possible by the stretching rod.

Furthermore, in cases where the stretching step is performed, an inner layer body separation step is preferably performed after the stretching rod is withdrawn from the delamination container. This prevents twining of the inner layer body around the stretching rod, which would otherwise occur as the inner layer body is separated from the outer layer body in the inner layer body separation step. Accordingly, it is ensured that the stretching rod may be separated from the delamination container.

Subsequently, the inner layer body separation step is performed on the delamination container molded in the container molding step. In the inner layer body separation step, the liquid filled into the container material, that is to say, into (the inner layer body of) the delamination container in the container molding step, is sucked out of the delamination container. This generates negative pressure inside the inner layer body, thereby permits the inner layer body to separate from the outer layer body. At this time, a majority of the inner layer body, excluding the mouth of the delamination container, is preferably separated from the outer layer body.

In this way, in the liquid blow-molding method for molding a delamination container according to the present disclosure, the inner layer body separation step is performed after the container molding step. Thus, the initial separation processing of separating the inner layer body from the outer layer body is performed in the delamination container that has been molded. That is to say, after the delamination container is molded by the liquid blow-molding method for molding a delamination container according to the present disclosure, the inner layer is separated from the outer layer body in the molded delamination container. Accordingly, when the content liquid is dispensed from the delamination container after the delamination container is filled with the content liquid and developed into a product, it is ensured that the inner layer body may be separated from the outer layer body.

The liquid blow-molding method for molding a delamination container according to the present disclosure may also include the inner layer body return step performed after the inner layer body separation step. In the inner layer body return step, the liquid is supplied again into (the inner layer body of) the delamination container, in which the inner layer body has been separated from the outer layer body in the inner layer body separation step. Consequently, the inner layer body, which has been separated from the outer layer body and undergone volume reduction and deformation inside the outer layer body, is expanded by the pressure of the liquid supplied into the inner layer body. Thus, the inner layer body is laminated on an inner surface of the outer layer body.

Thus, in the liquid blow-molding method for molding a delamination container according to the present disclosure, the inner layer body return step may be performed after the inner layer body separation step. This permits molding of the delamination container in which the inner layer body, on which the initial separation processing has been performed, is laminated on the outer layer body.

When the inner layer body return step is performed, the content liquid that is to be filled into the delamination container as the final product is preferably used as the liquid used in the container molding step and in the inner layer body return step.

When the content liquid that is to be filled into the delamination container as the final product is used as the liquid used in the container molding step and in the inner layer body return step, the liquid supplied into the delamination container in the inner layer body return step is less in amount than the liquid supplied into the container material in the container molding step. This permits supply of the liquid of an amount and a pressure sufficient to blow-mold the container material into the container material in the container molding step. Besides, a desired amount of the liquid, which is to be filled into the delamination container as the final product, is filled without the need to perform the suck-back step of drawing a predetermined amount of the liquid out of the delamination container immediately before sealing the delamination container.

Figure 3:
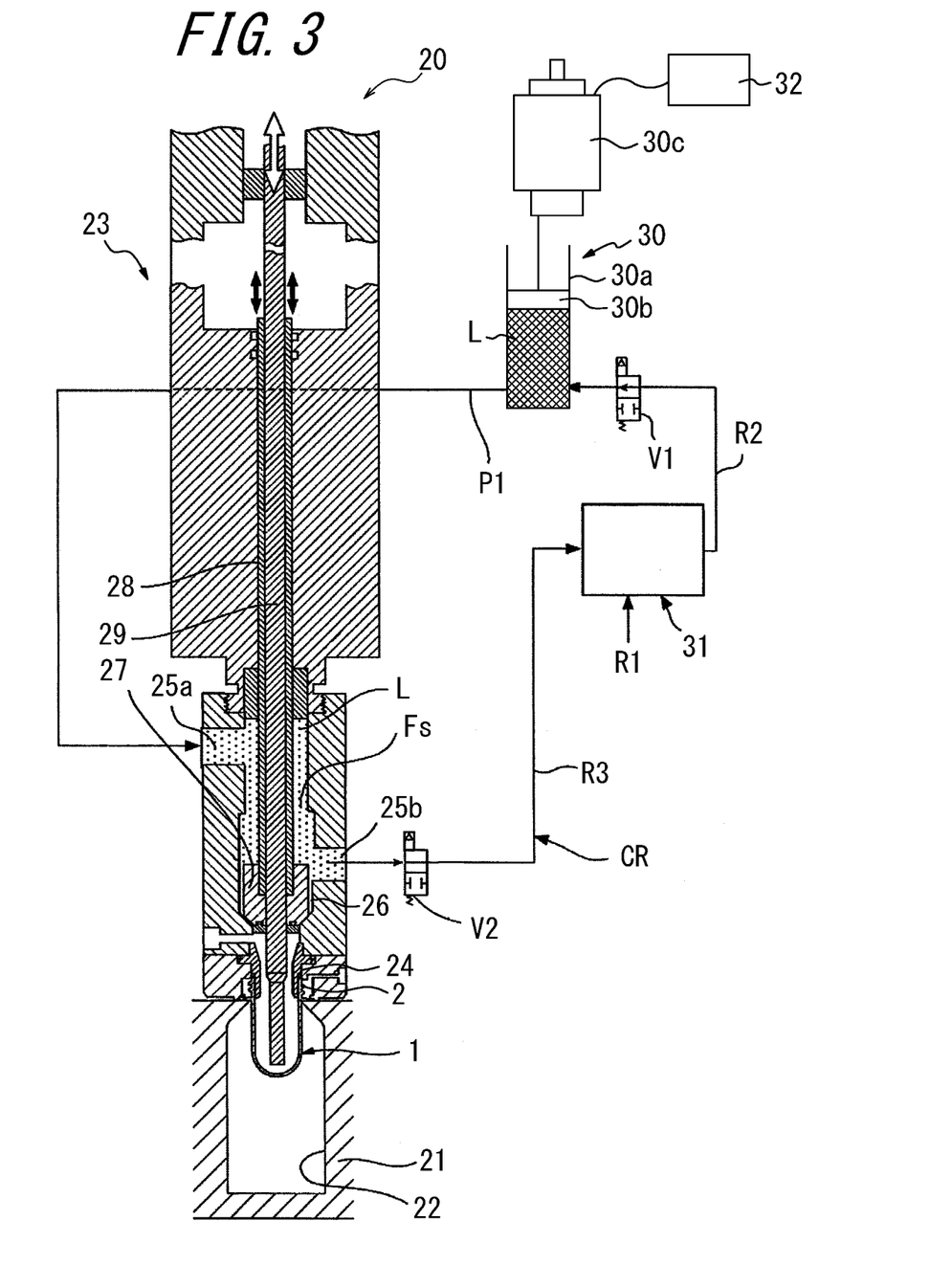
FIG. 3 illustrates an example of a liquid blow-molding device that may implement a liquid blow-molding method for molding a delamination container according to one of embodiments of the present disclosure.

The liquid blow-molding method for molding a delamination container according to the one of embodiments of the present disclosure may be implemented by using, for example, a liquid blow-molding device 20, which is illustrated in FIG. 3. In the following, a description is firstly given of the configuration of the liquid blow-molding device 20.

The liquid blow-molding device 20 includes a mold 21, which is used for blow-molding. The mold 21 has a bottle-shaped cavity 22, and the cavity 22 is open upward on an upper surface of the mold 21. Although not illustrated in detail, the mold 21 may be opened into right and left mold halves, and a molded product may be removed from the mold 21 by opening the mold 21.

To the mold 21, the preform 1 as the container material, which is to be liquid blow-molded by the blow-molding device 20 into the delamination container, may be fitted. FIG. 3 illustrates the state where the preform 1 of FIG. 1 is fitted to the mold 21.

On the upper side of the mold 21, there is disposed a nozzle unit 23, which is displaceable upward and downward relative to the mold 21. The nozzle unit 23 is provided, in a lower end thereof, with a blow nozzle 24. By descending the nozzle unit 23 to the lowermost limit, the blow nozzle 24 is fitted to the mouth 2 of the preform 1, which is fitted to the mold 21.

The nozzle unit 23 is provided, inside thereof, with a supply path Fs, which extends vertically. The supply path Fs includes an introduction port 25a and a discharge port 25b. The supply path Fs is also provided, in a lower end thereof, with a supply hole 26, via which the supply path Fs communicates with the blow nozzle 24.

Inside the supply path Fs, a sealing body 27, which is used to open and close the blow nozzle 24, is disposed. Inside the supply path Fs, a shaft body 28 is also disposed. The shaft body 28 has a long and narrow cylindrical rod shape and extends along the axis of the supply path Fs. The sealing body 27 is fixed coaxially to a lower end of the shaft body 28. The shaft body 28 is displaceable upward and downward inside the supply path Fs. When the shaft body 28 is displaced to its lowermost stroke end, the sealing body 27 is disposed in the supply hole 26, thereby closing the blow nozzle 24.

The shaft body 28 is hollow, and a stretching rod 29 is slidably fitted inside the shaft body 28. The stretching rod 29 is displaceable in the axis direction relative to the shaft body 28, and a lower end of the stretching rod 29 protrudes from a lower end of the sealing body 27. The stretching rod 29, when being displaced downward, stretches the preform 1 in the longitudinal (axial) direction inside the mold 21.

To the nozzle unit 23, a plunger pump 30 and a liquid circulation unit 31 are connected.

The plunger pump 30 includes a cylinder 30a and a plunger 30b, which is fitted in the cylinder 30a in a manner such that the plunger 30b is displaceable along the axis direction. The plunger 30b is configured, when being actuated, to supply the pressurized liquid L into the supply path Fs from the introduction port 25a via a pipe P1. In the illustrated example, the plunger pump 30 is servo plunger-type including an electric motor 30c, which serves as a driving source and which is capable of positive and reverse rotation. The plunger 30b is configured to be driven by the electric motor 30c and actuated in the positive and the reverse direction along the axis direction in the cylinder 30a. To the electric motor 30c, a control device 32 is connected, and the control device 32 controls actuation of the electric motor 30c.

The liquid circulation unit 31 has the functions of regulating the liquid L to a predetermined temperature and supplying the liquid L to the plunger pump 30 through a pipe R2 while additionally supplementing the liquid L from a pipe R1 and of circulating the liquid L between the plunger pump 30 and the supply path Fs while regulating the liquid L to a predetermined temperature. That is to say, the liquid L may be circulated around a circulation path CR, which is defined along the supply path Fs → discharge port 25b → pipe R3 → liquid circulation unit 31 → pipe R2 → plunger pump 30 → pipe P1 → introduction port 25a → supply path Fs, as needed.

Two electromagnetic valves V1 and V2 are disposed in the circulation path CR, and predetermined flow paths are opened and closed by the corresponding valves V1 and V2 in accordance with processes in blow-molding.

Figure 4:
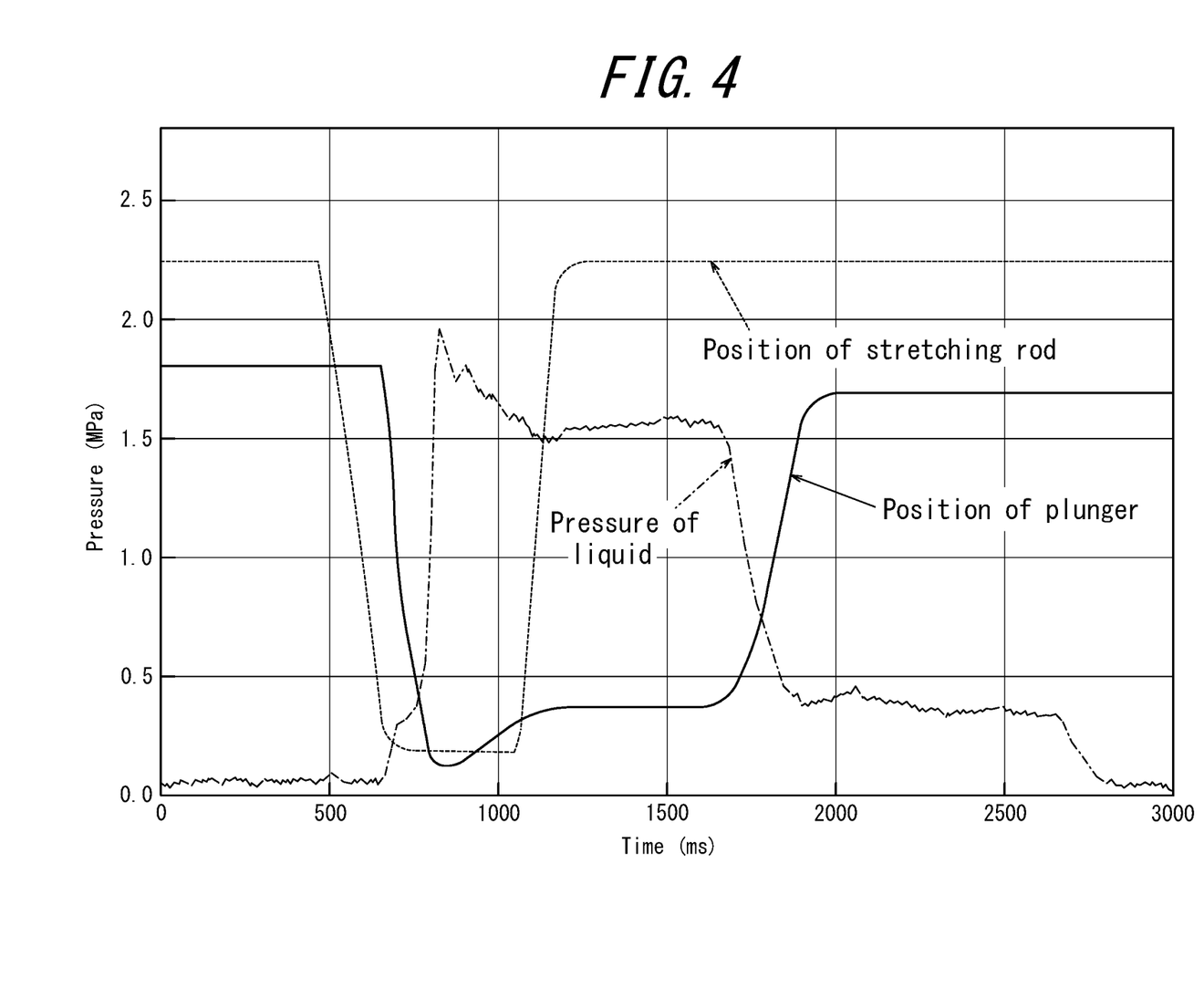
FIG. 4 is a timing chart illustrating a liquid blow-molding method for molding a delamination container according to one of embodiments of the present disclosure.

Next, with reference to FIG. 4, a description is given of a procedure of the liquid blow-molding method for molding a delamination container according to one of embodiments of the present disclosure in which the aforementioned liquid blow-molding device 20 is used.

In cases where the aforementioned liquid blow-molding device 20 is used to implement the liquid blow-molding method for molding a delamination container according to the present disclosure, the preform 1 illustrated in FIG. 1 is used as the container material.

When the preform 1 is fitted to the mold 21, as represented by a dash line in FIG. 4, the stretching step is performed firstly. In the stretching step, the preform 1 is stretched in the axis direction by the stretching rod 29.

Once the stretching rod 29 is displaced to the stroke end to stretch the preform 1 to a predetermined length in the axis direction, the plunger pump 30 is actuated in the positive direction subsequently. Thus, the plunger 30b is displaced downward in FIG. 3 for the container molding step. That is to say, as represented by a solid line in FIG. 4, in the container molding step, the plunger 30b of the plunger pump 30 is displaced downward in the state where the blow nozzle 24 is opened by the sealing body 27. This permits the pressurized liquid L to be supplied from the plunger pump 30 to the blow nozzle 24 via the supply path Fs. The pressurized liquid L is in turn supplied into the preform 1 through the blow nozzle 24. Thus, the preform 1 is liquid blow-molded into the delamination container of a shape conforming to the cavity 22 of the mold 21, that is to say, into the delamination container 10, which is illustrated in FIG. 2.

At this time, as represented by an alternate long and short dash line in FIG. 4, the pressure of the liquid L supplied into the preform 1 is increased rapidly to a predetermined pressure in response to the actuation of the plunger pump 30.

After the delamination container 10 is molded in the container molding step, the stretching rod 29 is withdrawn from the delamination container 10. Then, the inner layer body separation step follows. In the inner layer body separation step, the plunger pump 30 is actuated in the reverse direction, and the plunger 30b is displaced upward in FIG. 3. Accordingly, the liquid L, which has been filled in the delamination container 10, is sucked out of the delamination container 10 through the mouth 11. That is to say, by the plunger pump 30 being actuated in the opposite direction to the direction in the container molding step, the liquid L, which has been filled in the delamination container 10, is sucked by the plunger pump 30 via the supply path Fs. The result is that the inner layer body 14 is separated from the outer layer body 13 and undergoes volume reduction and deformation in the delamination container 10, which has been molded in the container molding step.

In this way, with the liquid blow-molding method for molding a delamination container according to the above embodiment, the delamination container 10, in which the inner layer body 14 is separated from the outer layer body 13, is molded by liquid blow-molding the preform 1 as the container material. Accordingly, by simply filling the content liquid into the delamination container 10, for example, in the subsequent step to develop the delamination container 10 into a product, it is ensured that the inner layer body 14 may be separated from the outer layer body 13 when the content liquid is dispensed from the delamination container 10. Thus, the delamination container 10 is ensured to exert its function.

Figure 5:
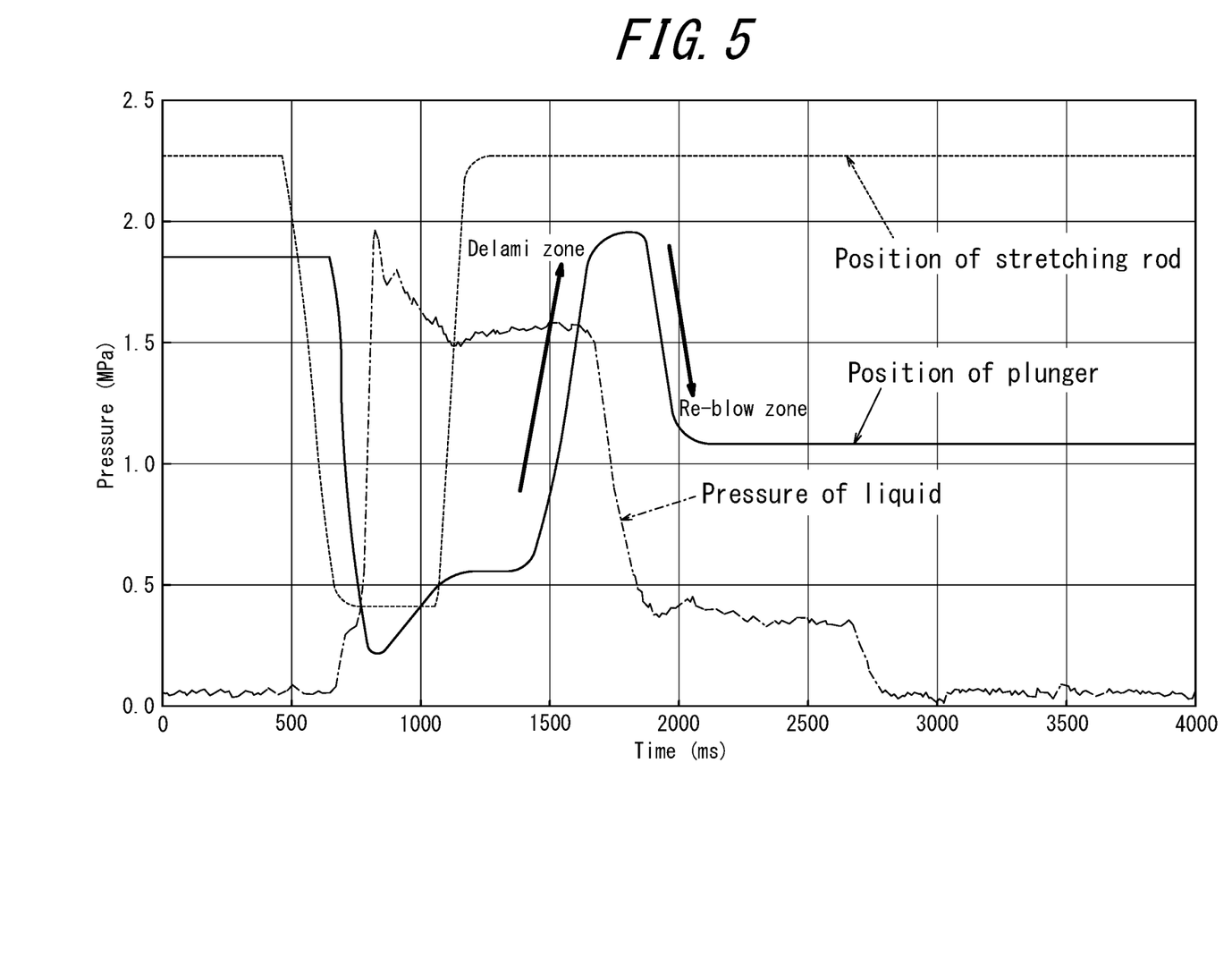
FIG. 5 is a timing chart illustrating a modification of a method for liquid blow-molding a delamination container of FIG. 4.

FIG. 5 is a timing chart illustrating a modification of the liquid blow-molding method for molding a delamination container illustrated in FIG. 4. In the modification illustrated in FIG. 5, the inner layer body separation step is followed by the inner layer body return step, although the stretching step, the container molding step, and the inner layer body separation step are performed by using the liquid blow-molding device 20, which is illustrated in FIG. 3 in the same way as in the example illustrated in FIG. 4.

In the inner layer body return step, as illustrated by a solid line in FIG. 5, after the inner layer body separation step, in which the plunger pump 30 is actuated in the reverse direction, the plunger pump 30 is actuated in the positive direction again. Accordingly, the plunger 30b is displaced downward in FIG. 3, and the liquid L is supplied again into the delamination container 10, in which the inner layer body 14 has been separated from the outer layer body 13. Consequently, the inner layer body 14, which has been separated from the outer layer body 13 and undergone volume reduction and deformation, is expanded by the pressure of the liquid L supplied into the inner layer body 14. The inner layer body 14 is thus returned to the state where the inner layer body 14 is laminated on the inner surface of the outer layer body 13. The above processes permit production of a product in which the liquid L is filled in the delamination container 10, while maintaining good appearance of the delamination container 10, in which the inner layer body 14 is laminated on the outer layer body 13.

Furthermore, in the inner layer body return step, a travel of the plunger 30b, that is to say, the magnitude of actuation of the plunger pump 30, is less than that in the container molding step. That is to say, the liquid L supplied into the delamination container 10 in the inner layer body return step is less in amount than the liquid L supplied into the preform 1 in the container molding step. This permits supply of the liquid L of an amount and a pressure sufficient to blow-mold the preform 1 into the preform 1 in the container molding step. Besides, a desired amount of the liquid L, which is to be filled into the delamination container 10 as the final product, is filled without the need to perform the suck-back step of drawing a predetermined amount of the liquid L out of the delamination container 10.

The present disclosure is not limited to the above embodiments, and various changes may be made without departing the gist of the present disclosure.

For example, in the above embodiments, the liquid blow-molding device 20, which includes the plunger pump 30, is used as a device that supplies the liquid L into the preform 1 and the delamination container 10, which results from the molding. However, the present disclosure is not limited to the embodiments, and a liquid blow-molding device including another type of pump or the like may also be used.

Furthermore, although in the above embodiments the preform 1 is used as the container material, the present disclosure is not limited to the embodiments. For example, as the container material, a laminated parison that is formed by, for example, co-extrusion molding in a tubular shape including an outer layer and an inner layer may also be used. In this case, the laminated parison is disposed in the mold, with one end thereof been pinched off by the mold.

Moreover, in the inner layer body separation step in the above embodiments, the inner layer body 14 is separated from the outer layer body 13 by sucking the liquid L out of the delamination container 10 that has been molded by actuating the plunger pump 30 in the reverse direction. However, the present disclosure is not limited to the embodiments. The inner layer body 14 may be separated from the outer layer body 13 by pushing out the liquid L in the delamination container 10 by introducing pressurized air between the outer layer body 13 and the inner layer body 14 via a nozzle inserted to the ambient air introduction hole 7.

REFERENCE SIGNS LIST

1 Preform
2 Mouth
3 Main body
4 Outer layer
5 Inner layer
6 Intermediate layer
7 Ambient air introduction hole
10 Delamination container
11 Mouth
12 Trunk
13 Outer layer body
14 Inner layer body
15 Intermediate body
20 Liquid blow-molding device
21 Mold
22 Cavity
23 Nozzle unit
24 Blow nozzle
25a Introduction port
25b Discharge port
26 Supply hole
27 Sealing body
28 Shaft body
29 Stretching rod
30 Plunger pump
30a Cylinder
30b Plunger
30c Electric motor
31 Liquid circulation unit
32 Control device
Fs Supply path
P1 Pipe
L Liquid
R1 Pipe
R2 Pipe
R3 Pipe
CR Circulation path
V1 valve
V2 valve

The invention claimed is:

1. A liquid blow-molding method for molding a delamination container from a resin container material, the resin container material including an outer layer, an inner layer, and an ambient air introduction hole provided in the outer layer to communicate between the outer layer and the inner layer, and the delamination container including an outer layer body and an inner layer body laminated on an inner side of the outer layer body in a manner such that the inner layer body is separatable from the outer layer body, the liquid blow-molding method comprising:
    a container molding step of molding the resin container material into the delamination container by actuating a plunger pump in a positive direction and supplying a pressurized liquid into the resin container material; and
    an inner layer body separation step of separating the inner layer body from the outer layer body by actuating the plunger pump in a reverse direction and sucking the pressurized liquid, which has been filled in the delamination container, out of the delamination.

2. The liquid blow-molding method for molding a delamination container according to claim 1, the liquid blow-molding method further comprising:
    an inner layer body return step, performed after the inner layer body separation step, of laminating the inner layer body on an inner surface of the outer layer body by supplying the pressurized liquid again into the delamination container, in which the inner layer body has been separated from the outer layer body.

3. The liquid blow-molding method for molding a delamination container according to claim 2, wherein the pressurized liquid supplied into the delamination container in the inner layer body return step is less in amount than the pressurized liquid supplied into the resin container material in the container molding step.

4. The liquid blow-molding method for molding a delamination container according to claim 2, wherein,
    in the container molding step, the pressurized liquid is supplied into the resin container material by actuating a plunger pump in a positive direction,
    in the inner layer body separation step, the pressurized liquid, which has been filled in the delamination container, is sucked out of the delamination container by actuating the plunger pump in a reverse direction, and
    in the inner layer body return step, the pressurized liquid is supplied into the delamination container by actuating the plunger pump in the positive direction again.

5. The liquid blow-molding method for molding a delamination container according to claim 3, wherein,
in the container molding step, the pressurized liquid is supplied into the resin container material by actuating a plunger pump in a positive direction,
in the inner layer body separation step, the pressurized liquid, which has been filled in the delamination container, is sucked out of the delamination container by actuating the plunger pump in a reverse direction, and
in the inner layer body return step, the pressurized liquid is supplied into the delamination container by actuating the plunger pump in the positive direction again.

6. The liquid blow-molding method for molding a delamination container according to claim 1, wherein, the resin container material comprises a preform having a bottomed tubular shape.

7. The liquid blow-molding method for molding a delamination container according to claim 6, the liquid blow-molding method further comprising:
a stretching step, performed prior to the container molding step, of stretching the preform in an axis direction by a stretching rod, wherein
the inner layer body separation step is performed after the stretching rod is withdrawn from the delamination container.

8. The liquid blow-molding method for molding a delamination container according to claim 2, wherein, the resin container material comprises a preform having a bottomed tubular shape.

9. The liquid blow-molding method for molding a delamination container according to claim 3, wherein, the resin container material comprises a preform having a bottomed tubular shape.

10. The liquid blow-molding method for molding a delamination container according to claim 4, wherein, the resin container material comprises a preform having a bottomed tubular shape.

11. The liquid blow-molding method for molding a delamination container according to claim 5, wherein, the resin container material comprises a preform having a bottomed tubular shape.

12. The liquid blow-molding method for molding a delamination container according to claim 8, the liquid blow-molding method further comprising:
a stretching step, performed prior to the container molding step, of stretching the preform in an axis direction by a stretching rod, wherein
the inner layer body separation step is performed after the stretching rod is withdrawn from the delamination container.

13. The liquid blow-molding method for molding a delamination container according to claim 9, the liquid blow-molding method further comprising:
a stretching step, performed prior to the container molding step, of stretching the preform in an axis direction by a stretching rod, wherein
the inner layer body separation step is performed after the stretching rod is withdrawn from the delamination container.

14. The liquid blow-molding method for molding a delamination container according to claim 10, the liquid blow-molding method further comprising:
a stretching step, performed prior to the container molding step, of stretching the preform in an axis direction by a stretching rod, wherein
the inner layer body separation step is performed after the stretching rod is withdrawn from the delamination container.

15. The liquid blow-molding method for molding a delamination container according to claim 11, the liquid blow-molding method further comprising:
a stretching step, performed prior to the container molding step, of stretching the preform in an axis direction by a stretching rod, wherein
the inner layer body separation step is performed after the stretching rod is withdrawn from the delamination container.

* * * * *